United States Patent
Weigand et al.

(10) Patent No.: US 7,991,911 B2
(45) Date of Patent: *Aug. 2, 2011

(54) DUPLICATING SWITCH FOR STREAMING DATA UNITS TO A TERMINAL USING DIFFERENT COMMUNICATION PROTOCOLS

(75) Inventors: Gilbert G. Weigand, Ashburn, VA (US); William J. Raduchel, Palo Alto, CA (US)

(73) Assignee: AOL Inc., Dulles, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/732,929

(22) Filed: Mar. 26, 2010

(65) Prior Publication Data

US 2010/0185778 A1 Jul. 22, 2010

Related U.S. Application Data

(63) Continuation of application No. 11/754,661, filed on May 29, 2007, now Pat. No. 7,694,013, which is a continuation of application No. 10/090,727, filed on Mar. 6, 2002, now Pat. No. 7,237,033, which is a continuation-in-part of application No. 09/893,692, filed on Jun. 29, 2001, now Pat. No. 7,266,609.

(60) Provisional application No. 60/343,183, filed on Dec. 31, 2001, provisional application No. 60/286,964, filed on Apr. 30, 2001.

(51) Int. Cl.
*G06F 15/173* (2006.01)
(52) U.S. Cl. .......................... 709/238; 709/231; 709/232
(58) Field of Classification Search .................. 709/238, 709/231, 232, 202, 203, 217, 219; 370/395.52, 370/238

See application file for complete search history.

(56) References Cited

U.S. PATENT DOCUMENTS

| | | |
|---|---|---|
| 4,872,160 A | 10/1989 | Hemmady et al. |
| 5,283,639 A | 2/1994 | Esch et al. |
| 5,493,568 A | 2/1996 | Sampat et al. |
| 5,583,561 A | 12/1996 | Baker et al. |
| 5,600,646 A | 2/1997 | Polomski |
| 5,604,542 A | 2/1997 | Dedrick |
| 5,682,597 A | 10/1997 | Ganek et al. |
| 5,689,641 A | 11/1997 | Ludwig et al. |
| 5,774,660 A | 6/1998 | Brendel et al. |
| 5,799,002 A | 8/1998 | Krishman |

(Continued)

FOREIGN PATENT DOCUMENTS

EP 1 063 814 12/2000

(Continued)

OTHER PUBLICATIONS

Keller et al., An Active Router Architecture for Multicast Video Distribution, St. Louis, Missouri.

(Continued)

*Primary Examiner* — Le Luu
(74) *Attorney, Agent, or Firm* — Finnegan, Henderson, Farabow, Garrett & Dunner, LLP

(57) ABSTRACT

Streaming to a terminal by using a duplicating switch to receive a stream of data units, using the duplicating switch to store content from the stream, using the duplicating switch to generate a second stream that incorporates the content that was stored and address information corresponding to more than one terminal whose addressing information was not part of the first stream, and using the duplicating switch to make the second stream of data units available to two or more terminals.

13 Claims, 10 Drawing Sheets

U.S. PATENT DOCUMENTS

| | | |
|---|---|---|
| 5,802,301 A | 9/1998 | Dan et al. |
| 5,809,237 A | 9/1998 | Watts et al. |
| 5,815,662 A | 9/1998 | Ong |
| 5,838,912 A | 11/1998 | Poon et al. |
| 5,841,763 A | 11/1998 | Leondires et al. |
| 5,867,502 A | 2/1999 | Chang |
| 5,872,588 A | 2/1999 | Aras et al. |
| 5,913,062 A | 6/1999 | Vrvilo et al. |
| 5,935,245 A | 8/1999 | Sherer |
| 5,946,614 A | 8/1999 | Robbins et al. |
| 5,973,722 A | 10/1999 | Wakai et al. |
| 6,011,782 A | 1/2000 | DeSimone et al. |
| 6,052,805 A | 4/2000 | Chen et al. |
| 6,061,349 A | 5/2000 | Coile et al. |
| 6,061,504 A | 5/2000 | Tzelnic et al. |
| 6,097,720 A | 8/2000 | Araujo et al. |
| 6,101,187 A | 8/2000 | Cukier et al. |
| 6,115,752 A | 9/2000 | Chauhan |
| 6,119,163 A | 9/2000 | Monteiro et al. |
| 6,141,336 A | 10/2000 | Bauchot et al. |
| 6,151,621 A | 11/2000 | Colyer et al. |
| 6,151,632 A | 11/2000 | Chaddha et al. |
| 6,157,635 A | 12/2000 | Wang et al. |
| 6,173,314 B1 | 1/2001 | Kurashima et al. |
| 6,189,039 B1 | 2/2001 | Harvey et al. |
| 6,195,680 B1 | 2/2001 | Goldszmidt et al. |
| 6,201,859 B1 | 3/2001 | Mernhard et al. |
| 6,226,686 B1 | 5/2001 | Rothschild et al. |
| 6,259,701 B1 | 7/2001 | Shur et al. |
| 6,266,335 B1 | 7/2001 | Bhaskaran |
| 6,298,129 B1 | 10/2001 | Culver et al. |
| 6,314,464 B1 | 11/2001 | Murata et al. |
| 6,327,622 B1 | 12/2001 | Jindal et al. |
| 6,347,090 B1 | 2/2002 | Ooms et al. |
| 6,363,075 B1 | 3/2002 | Huang et al. |
| 6,363,429 B1 | 3/2002 | Ketcham |
| 6,370,112 B1 | 4/2002 | Voelker |
| 6,377,996 B1 | 4/2002 | Lumelsky et al. |
| 6,381,746 B1 | 4/2002 | Urry |
| 6,389,462 B1 | 5/2002 | Cohen et al. |
| 6,404,745 B1 | 6/2002 | O'Neil et al. |
| 6,415,312 B1 | 7/2002 | Boivie |
| 6,415,323 B1 | 7/2002 | McCanne et al. |
| 6,418,214 B1 | 7/2002 | Smythe et al. |
| 6,434,622 B1 | 8/2002 | Monteiro et al. |
| 6,437,830 B1 | 8/2002 | Horlander |
| 6,457,043 B1 | 9/2002 | Kwak et al. |
| 6,466,550 B1 | 10/2002 | Foster et al. |
| 6,490,285 B2 | 12/2002 | Lee et al. |
| 6,510,553 B1 | 1/2003 | Hazra |
| 6,516,350 B1 | 2/2003 | Lumelsky et al. |
| 6,625,773 B1 | 9/2003 | Boivie et al. |
| 6,646,997 B1 | 11/2003 | Baxley et al. |
| 6,665,726 B1 | 12/2003 | Leighton et al. |
| 6,708,213 B1 | 3/2004 | Bommaiah |
| 6,711,212 B1 | 3/2004 | Lin |
| 6,728,356 B1 | 4/2004 | Carroll |
| 6,728,784 B1 | 4/2004 | Mattaway |
| 6,751,219 B1 | 6/2004 | Lipp et al. |
| 6,785,704 B1 | 8/2004 | McCanne |
| 6,847,618 B2 | 1/2005 | Laursen et al. |
| 6,850,707 B1 | 2/2005 | Chang et al. |
| 6,873,627 B1 | 3/2005 | Miller et al. |
| 6,879,565 B2 | 4/2005 | Baxley et al. |
| 6,910,078 B1 | 6/2005 | Raman et al. |
| 7,054,949 B2 | 5/2006 | Jennings |
| 7,072,972 B2 | 7/2006 | Chin et al. |
| 7,133,922 B1 | 11/2006 | She et al. |
| 7,237,033 B2 | 6/2007 | Weigand et al. |
| 7,266,609 B2 | 9/2007 | Bill et al. |
| 7,292,571 B2 | 11/2007 | Brown |
| 7,299,291 B1 | 11/2007 | Shaw |
| 2002/0024956 A1 | 2/2002 | Keller-Tuberg |
| 2002/0026482 A1 | 2/2002 | Morishige et al. |
| 2002/0031126 A1 | 3/2002 | Crichton et al. |
| 2002/0065922 A1 | 5/2002 | Shastri |
| 2002/0093963 A1 | 7/2002 | Roullet et al. |
| 2002/0103864 A1 | 8/2002 | Rodman et al. |
| 2002/0112004 A1 | 8/2002 | Reid et al. |
| 2002/0112069 A1 | 8/2002 | Sim |
| 2002/0114302 A1 | 8/2002 | McDonald et al. |
| 2002/0116532 A1 | 8/2002 | Berg |
| 2002/0161847 A1 | 10/2002 | Weigand et al. |
| 2002/0161910 A1 | 10/2002 | Bill et al. |
| 2003/0061278 A1 | 3/2003 | Agarwalla et al. |
| 2003/0099202 A1 | 5/2003 | Lear et al. |
| 2003/0126197 A1 | 7/2003 | Black et al. |
| 2003/0145038 A1 | 7/2003 | Bin Tariq et al. |
| 2003/0154283 A1 | 8/2003 | Brown |
| 2004/0025186 A1 | 2/2004 | Jennings et al. |
| 2005/0010653 A1 | 1/2005 | McCanne |
| 2006/0248231 A1 | 11/2006 | O'Rourke et al. |
| 2007/0288639 A1 | 12/2007 | Brown |
| 2008/0140851 A1 | 6/2008 | Weigand et al. |

FOREIGN PATENT DOCUMENTS

| | | |
|---|---|---|
| GB | 2 309 849 | 2/1996 |
| JP | 9270793 | 10/1997 |
| WO | WO 96/38961 | 12/1996 |
| WO | 99/27741 | 6/1999 |
| WO | 00/65775 | 11/2000 |
| WO | 00/65776 | 11/2000 |
| WO | 00/69101 | 11/2000 |

OTHER PUBLICATIONS

Lockwood et al., Reprogrammable Network Packet Processing on the Field Programmable Port Extender (FPX), 2001, St. Louis, Missouri.

Taylor et al., Dynamic Hardware Plugins (DHP): Exploiting Reconfigurable Hardware for High-Performance Programmable Routers, 2002, St. Louis, Missouri.

Choi et al., Design of a Flexible Open Platform for High Performance Active Networks, 1999, St. Louis, Missouri.

PCT International Search Report, for International Application PCT/US02/13362, Apr. 8, 2003, 6 pages.

International Search Report dated Jul. 2, 2003 (Appln. No. PCT/US03/12086).

International Preliminary Examination Report (IPER), dated Feb. 24, 2004, Appln. No. PCT/US02/13362.

Office Action for U.S. Appl. No. 10/134,552, dated Oct. 11, 2005.

Office Action for Japanese Application No. 2002-586120 dated Oct. 10, 2008, 1 page.

Office Action for Japanese Application No. 2002-586120 dated Mar. 4, 2008, 1 page.

S. Miyazaki, et al.., "Stream Transmission Control Application Program Interface", Technical Report of IEICE, vol. 100, No. 672, pp. 341-346. English Language Abstract included.

Furht, B. et al., "IP Simulcast: A New Technique for Multimedia Broadcasting Over the Internet;" Cit. Journal of Computing and Information Technology, Zagreb, HR, vol. 6, No. 3, Sep. 1, 1998, pp. 245-254, XP000870379, ISSN: 1330-1136, the whole document.

ST2 Working Group L. Degrossi & L. Berger et al., "Internet Stream Protocol VCersion 2 (ST2) Protocol Specification—Version ST2+; rfc1819.txt." IETF Standard Internet Engineering Task Force, IETF, CH, Aug. 1, 1995, XP015007606 ISSN: 0000-0003, Chapter 1 p. 6-p. 19.

European Office Action issued in EP02734066.0 on Apr. 16, 2009, 6 pages.

Supplemental European Search Report issued in EP02734066.0 on Jul. 31, 2006.

European Office Action issued in EP02725839.1 on Apr. 16, 2009, 5 pages.

Indian Office Action issued in 1764/DELNP/2003 on Apr. 16, 2008.

U.S. Office Action issued in U.S. Appl. No. 11/754,661 on May 29, 2007, 13 pages.

U.S. Office Action issued in U.S. Appl. No. 11/761,050 on Jul. 27, 2009, 14 pages.

U.S. Office Action issued in U.S. Appl. No. 10/090,727, on Oct. 11, 2005, 15 pages.

U.S. Office Action issued in U.S. Appl. No. 10/157,909 on Aug. 9, 2006, 13 pages.

Chinese Office Action issued in 02810728.4 on Jun. 23, 2006.

Chinese Office Action issued in 02810728.4 on Jul. 13, 2007.
Chinese Office Action issued in 02810728.4 on Feb. 29, 2008.
Australian Office Action issued on 200205256 on Feb. 9, 2007.
Australian Office Action issued on 200205256 on May 26, 2008.
U.S. Final Office Action issued in U.S. Appl. No. 11/761,050 on Feb. 3, 2010, 16 pages.
The Patent Office of the People's Republic of China, Office Action, Chinese App. No. 02810729.2, mailed on Aug. 12, 2005 (13 pages).
The Patent Office of the People's Republic of China, Office Action, Chinese App. No. 02810729.2, mailed on Nov. 2, 2007 (10 pages).
The Patent Office of the People's Republic of China, Office Action, Chinese App. No. 02810729.2, mailed on May 30, 2008 (9 pages).
USPTO, Office Action, U.S. Appl. No. 09/893,692, mailed on Dec. 23, 2004 (12 pages).
USPTO, Office Action, U.S. Appl. No. 11/754,661, mailed on Jun. 19, 2009 (8 pages).
USPTO, Office Action, U.S. Appl. No. 10/090,727, mailed on May 10, 2005 (6 pages).
USPTO, Final Office Action, U.S. Appl. No. 10/134,552, mailed on May 24, 2006 (13 pages).
USPTO, Final Office Action, U.S. Appl. No. 10/134,552, mailed on Aug. 8, 2006 (15 pages).
USPTO, Office Action, U.S. Appl. No. 10/134,552, mailed on Mar. 5, 2007 (18 pages).
USPTO, Office Action, U.S. Appl. No. 10/134,552, mailed on Sep. 11, 2007 (13 pages).

DUPLICATING SWITCH FOR STREAMING DATA UNITS TO A TERMINAL USING DIFFERENT COMMUNICATION PROTOCOLS

CROSS REFERENCE TO RELATED APPLICATIONS

This is a continuation of U.S. patent application Ser. No. 11/754,661, filed May 29, 2007, and titled "DUPLICATING SWITCH FOR STREAMING DATA UNITS TO A TERMINAL", now allowed, and is a continuation of U.S. patent application Ser. No. 10/090,727, filed Mar. 6, 2002, and titled "A DUPLICATING SWITCH FOR STREAMING DATA UNITS TO A TERMINAL", now allowed, which claims priority from U.S. Provisional Application No. 60/343,183, filed Dec. 31, 2001, and titled "A DUPLICATING SWITCH FOR STREAMING DATA UNITS TO A TERMINAL", and which is a continuation-in-part of U.S. application Ser. No. 09/893,692, filed Jun. 29, 2001, and titled "GENERATING MULTIPLE DATA STREAMS FROM A SINGLE DATA SOURCE", now allowed, which claims priority from U.S. Provisional Application No. 60/286,964, filed Apr. 30, 2001, and titled "GENERATING MULTIPLE DATA STREAMS FROM A SINGLE DATA SOURCE". The entire contents of the prior applications are incorporated herein in their entirety.

TECHNICAL FIELD

This application relates generally to streaming media.

BACKGROUND

The term multimedia streaming describes a process for allowing access to multimedia content from one or more sources. Increased usage of the Internet has resulted in an increased demand for multimedia streaming.

SUMMARY

In one general aspect, data units may be streamed to a terminal by using a duplicating switch to receive a first stream of data units, store content from the first stream, generate second streams that incorporate the stored content, and make the second streams available to the terminals.

Implementations may include one or more of the following features. For example, using the duplicating switch to store content may include storing content that is temporally related to the data units that are being generated. A location identifier may be used to indicate which portion of content is being generated into the second streams. Location identifiers may be used to access the content time-shifted as two different streams. Using the duplicating switch to store content also may include storing more than one instance of the same portion of content, and storing additional instances of the stream as demand for the content increases.

Using the duplicating switch to store content may include storing content and associated header information. Using the duplicating switch to store content also may include storing a checksum describing the content.

A second stream may be transmitted in response to receiving a request from a terminal or a service provider. Storing the content may include using location identifiers to track simultaneous transmissions of a single stored instance of a stream, and making streams available may include transmitting the different data units within the single stored instance to several requestors who have terminals receiving the stream that overlap but differ by a time differential. The duplicating switch may be a specialized device including hardware configured to perform one or more of receiving a first stream of data units, storing content from the first stream, generating second streams, and making the second streams available.

Other features and advantages will be apparent from the following description, including the drawings, and the claims.

DESCRIPTION OF DRAWINGS

Like reference symbols in the various drawings may indicate like elements.

DETAILED DESCRIPTION

Generally, a duplicating switch receives a source stream of data units and stores content of the stream to enable subsequent generation of one or more streams that incorporate the content. Storing the content permits time shifting of the content for subsequent transmission. For example, an on-demand system can be created to transmit stored content from a source stream in response to a user's request. The duplicating switch may use one or more pointers to enable simultaneous access to different portions of content from the same source stream and thus simultaneous generation of several different and offset streams from a single source stream. The duplicating switch may store multiple instances of content from a source stream to manage increased demand. The duplicating switch also may reduce overall storage requirements by storing only certain portions of the content from within a source stream.

For illustrative purposes, FIGS. 1-8 describe a communications system for using a duplicating switch to stream data units to a terminal. For brevity, several elements in the figures described below are represented as monolithic entities. However, as would be understood by one skilled in the art, these elements each may include numerous interconnected computers and components designed to perform a set of specified operations and/or dedicated to a particular geographical region.

Figure 1:
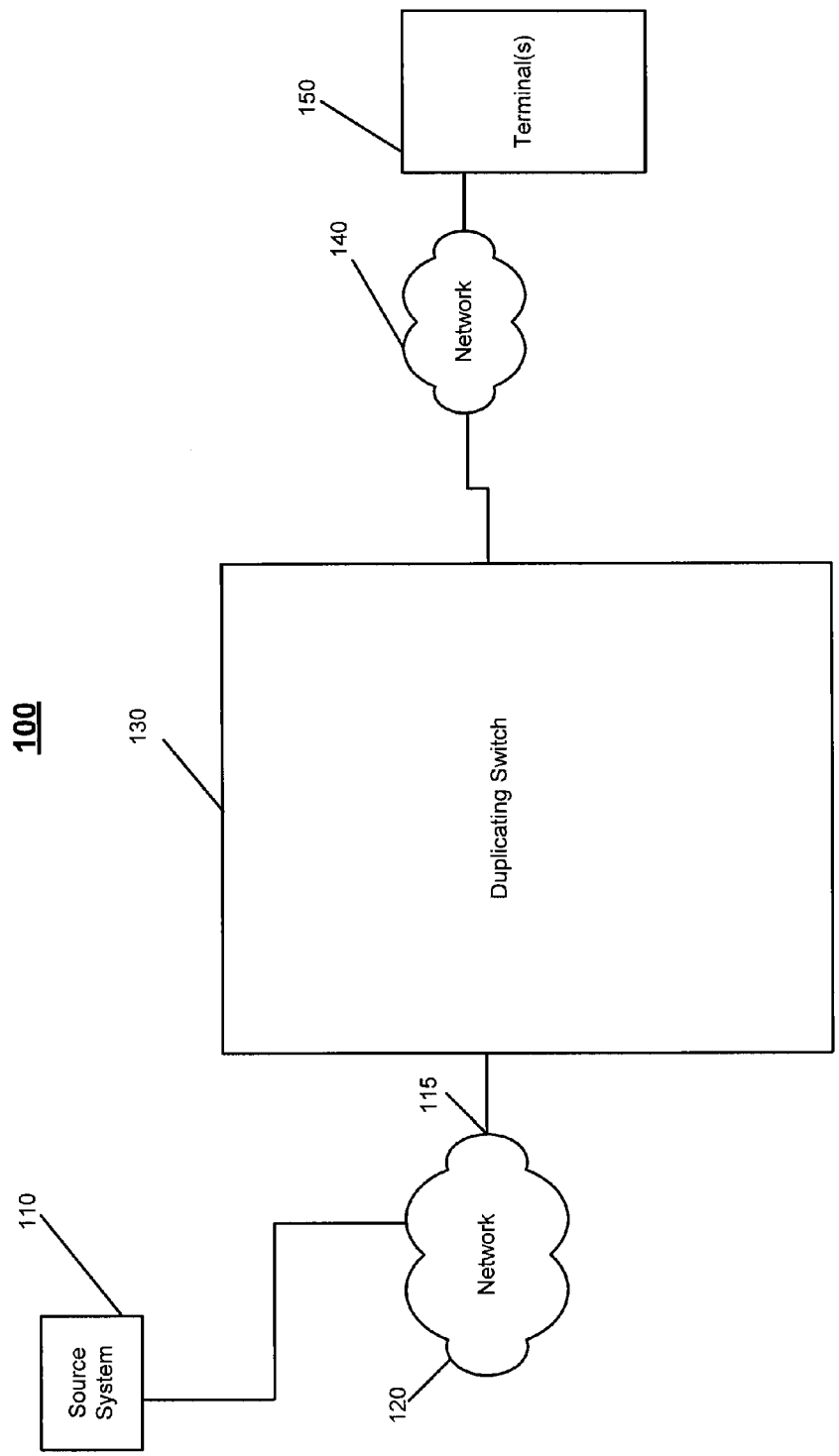
FIG. 1 is a block diagram of a communications system capable of using a duplicating switch to generate a stream of data units.

For illustrative purposes, FIG. 1 depicts a communications system 100 that implements techniques using a duplicating switch to stream data units to two or more terminals. Communications system 100 may be structured and arranged to include a source system 110, one or more terminals 150, and communication software and hardware enabling communications between source system 110 and terminals 150. More particularly, the communications system 100 typically includes the source system 110, a network 120, a duplicating switch 130, a network 140, and terminals 150. In actual implementations, the source system 110 generally transmits one or more data units in a stream of data units across network 120 to one or more duplicating switches 130, where content from the data units is stored, duplicated and transmitted to one or more terminals 150 through network 140 in an on-demand manner.

The source system 110 provides a stream of one or more data units across the network 120 to the duplicating switch 130. Typically, the source system 110 is structured and arranged to convert a media source (e.g., a video or audio feed) into data units for transmission across the network 120. The source system 110 may include a general-purpose computer having a central processor unit (CPU), and memory/storage devices that store data and various programs such as an operating system and one or more application programs. Other implementations of the source system 110 include a workstation, a server, a device, a special purpose device or component, other equipment or some combination thereof capable of responding to and executing instructions in a defined manner. The source system 110 also typically includes an input/output (I/O) device (e.g., video and audio input and conversion capability), and peripheral equipment such as a display communications card or device (e.g., a modem or a network adapter) for exchanging data with the network 120.

Implementations of the source system 110 also may include a media system that transmits one of more pieces of media content across a network 120. For example, a source system 110 may transmit signals formatted according to European Telecommunications Standards Institute (ETSI), Digital Video Broadcasting (DVB), Advanced Television Systems Committee (ATSC), or European Cable Communications Association (ECCA) standards across a network to a cable head end. In another implementation, a cable provider may transmit or direct video signals to a cable head end for distribution in a cable network.

A communications link 115 is used to communicate data between source system 110 and network 120. Communications link 115 may include wired or wireless modes of communication, such as a telephone line, a wireless network link, a cable network, or a direct connection.

The network 120 typically includes hardware and/or software capable of enabling direct or indirect communications between the source system 110 and the duplicating switch 130. The network 120 may include a direct link between the source system 110 and the duplicating switch 130, or it may include one or more networks or subnetworks between them (not explicitly shown). Each network or subnetwork may include, for example, a wired or wireless data pathway capable of carrying and receiving data. Examples of network 120 include the Internet, the World Wide Web, WANs ("Wide Area Network"), LANs ("Local Area Networks"), analog or digital wired and wireless telephone networks (e.g., PSTN ("Public Switched Telephone Network"), ISDN ("Integrated Services Digital Network"), or xDSL ("any form of Digital Subscriber Loop")), radio, television, cable, satellite, and/or other delivery mechanisms for carrying data.

Generally, the duplicating switch 130 is structured and arranged to store a received stream of data units for time-shifted transmission to more than one terminal. Implementations of the duplicating switch 130 may store one or more streams of data units. For example, the duplicating switch 130 may be capable of receiving a stream of IP ("Internet Protocol") video and storing that video for subsequent transmission. Implementations of duplicating switch 130 also may include hardware or software capable of transmitting or receiving media feeds not resembling a stream of data units. For example, the duplicating switch may include a cable head end system that is capable of receiving or transmitting European Telecommunications Standards Institute (ETSI), Digital Video Broadcasting (DVB), Advanced Television Systems Committee (ATSC), or European Cable Communications Association (ECCA) for transmission on a cable distribution system. The cable head end system may receive a satellite broadcast feed, convert the feed into a format suitable for storage, and thereafter convert the feed back to a different format for time-shifted transmission.

The network 140 generally includes one or more of links between the duplicating switch 130 and the terminals 150. For example, the network 140 may include a direct physical link or a series of links connected by various pieces of network equipment. Generally, aspects of network 140 may resemble aspects of network 120. For example, network 120 and network 140 may share one or more hardware or software devices. In another example, networks 120 and 140 may use the same type of circuits and/or equipment.

The terminal 150 may include one or more devices capable of receiving the stream of data units transmitted by duplicating switch 130 through network 140. The terminal 150 may include a controller (not shown) that processes instructions received from or generated by a software application, a program, a piece of code, a device, a computer, a computer system, or a combination thereof, which independently or collectively direct operations of the terminal 150. The instructions may be embodied permanently or temporarily in any type of machine, component, equipment, storage medium, or propagated signal that is capable of being delivered to the terminal 150 or that may reside with the controller at the terminal 150. The terminal 150 may include a general-purpose computer (e.g., a personal computer) capable of responding to and executing instructions in a defined manner, a workstation, a laptop, a PDA ("Personal Digital Assistant"), a wireless phone, a component, other equipment, or some combination of these items that is capable of responding to and executing instructions.

For instance, in one implementation, the terminal 150 includes one or more information retrieval software applications (e.g., a browser, a mail application, an instant messaging client, an Internet service provider client, or an AOL TV ("America Online Television") or other integrated client) capable of receiving one or more data units. The information retrieval applications may run on a general purpose operating system and a hardware platform that includes a general purpose processor and specialized hardware for graphics, communications and/or other capabilities. In another implementation, terminal 150 may include a wireless telephone running a micro-browser application on a reduced operating system with general purpose and specialized hardware capable of operating in mobile environments.

In another implementation, the terminal 150 may include a simplified device capable of receiving a video signal not encapsulated in a traditional data unit. For example, the duplicating switch 130 may transmit a raw video feed formatted in accordance with specifications set forth by, e.g., European Telecommunications Standards Institute (ETSI), Digital Video Broadcasting (DVB), Advanced Television Systems Committee (ATSC), or European Cable Communications Association (ECCA) for transmission directly to a cable tuner or television.

Figure 2:
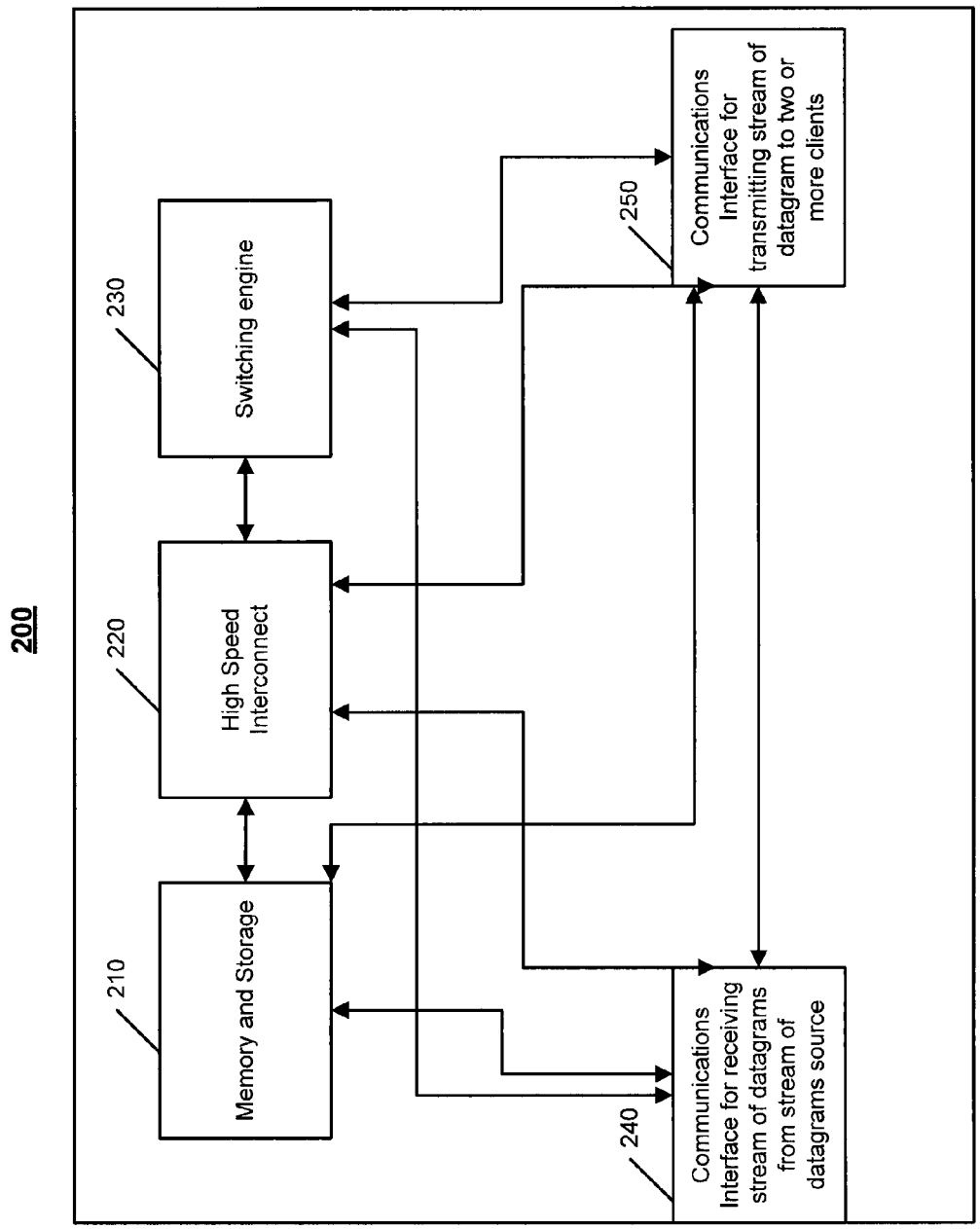
FIG. 2 is an exemplary component diagram of a duplicating switch suitable for use in the communications system of FIG. 1.

FIG. 2 illustrates a duplicating switch 200 structured and arranged to receive a stream, store content from the stream, generate data units from the stream, and transmit the generated data units as a stream. The duplicating switch 200 generally corresponds to the duplicating switch 130 in FIG. 1. The duplicating switch 200 generally includes a storage system 210 for storing the stream of data units, a high speed interconnect 220 between the various subsystems in the duplicating switch 200, a switching engine 230 for modifying and transmitting the stream of data units to two or more clients, a first communications interface 240 for receiving a stream of data units from a source system, and a second communications interface 250 for transmitting a stream of data units to two or more clients.

The storage system 210 enables the duplicating switch 200 to store at least the content portion of the data unit. The storage system 210 may be volatile or nonvolatile and may include memory (e.g., RAM) and/or storage (e.g., HDDS). Implementations of storage system 210 may include a hard disk drive or a more portable media, e.g., a compact disk, a tape drive, or an optical memory device. Implementations also may include combinations of memory and storage.

The high speed interconnect 220 generally refers to a device that connects a component of the duplicating switch 200 with other elements of the duplicating switch 200. Examples of the high speed interconnect 220 may include, but are not limited to, SCSI ("Small Computer Serial Interface"), Fibre Channel, UTOPIA ("Universal Test and Operations PHY interface for ATM ("Asynchronous Transfer Mode")), Infiniband, and other protocols and connection methods. The high speed interconnect may include physical, logical, timing and electrical connections and standards as well as protocols that enable these high speed interconnects to exchange data.

Generally, a switching engine 230 includes a device that performs network operations in hardware (e.g., a chip or part of chip). In some implementations, the switching engine 230 may include an ASIC ("Application Specific Integrated Circuit") implementing network operations logic directly on a chip (e.g., logical gates fabricated on a silicon wafer then manufactured into a chip). For example, an ASIC chip may include a logical gate structure implemented in silicon and configured to receive a packet
and filter based on examining an IP address.

Implementations of the switching engine 230 may include using a FPGA ("Field Programmable Gate Array"). An FPGA generally is defined as a chip fabricated to allow third parties to implement a variety of logical designs (e.g., group of gates) on the chip. For example, one designer may load a design that replaces the IP address of received IP packets with a different IP address. Another example may include a design that performs segmentation and reassembly of IP packets as they are modified during transmission of the IP packet through different networks.

Implementations of the switching engine 230 may include using a network processor. A network processor generally is defined as a chip that, among other features, allows software to specify which network operations should be performed. One example of a network processor may include several interconnected RISC ("Reduced Instruction Set Computer") processors fabricated in a network processor chip. The network processor chip may implement on some of the RISC processors software that change an IP address of an IP packet. Other RISC processors in the network processor may implement software that controls which terminals receive an IP stream.

The switching engine 230 may include a precoder (not shown) that is structured and arranged to receive a data unit, extract a content piece from the payload portion of the data unit, determine where the content piece will be stored, and store the content piece in a structured manner so that retrieval (e.g., playback) involves retrieving neighboring content pieces, packaging data units around the content pieces, and transmitting the data units to one or more requestors. This process will be described further with respect to FIG. 4.

The first communications interface 240 generally is structured and arranged to receive a stream of data units from a device such as the source system 110. Implementations of the communications interface may include a LAN or WAN interface with the ability to direct the data units to one or more locations in the duplicating switch 200, using, for example, the high speed interconnect 220. Implementations also may include other forms of transmitting a media signal, including ETSI, DVB, ATSC, or ECCA.

The second communications interface 250 generally is structured and arranged to transmit a stream of data units from the memory system 210 to one or more devices that generally correspond with recipients, such as terminal 150 described with respect to FIG. 1. Implementations of the second communications interface 250 may include a LAN or WAN interface with the ability to direct the data units to one or more locations in the duplicating switch 200 using, for example, the high speed interconnect 220. Implementations also may include other forms or transmitting a media signal other than by IP networking. In addition, the second communications interface 250 is not limited to the same type of format as the first communications interface 240, though they may include the same format and even the same physical interface. For example, the first communications interface 240 may include a POS ("Packet-over-SONET") interface while the second communications interface 250 may include some form of Ethernet (e.g., 100-Base-T, Gigabit Ethernet).

Figure 3A:
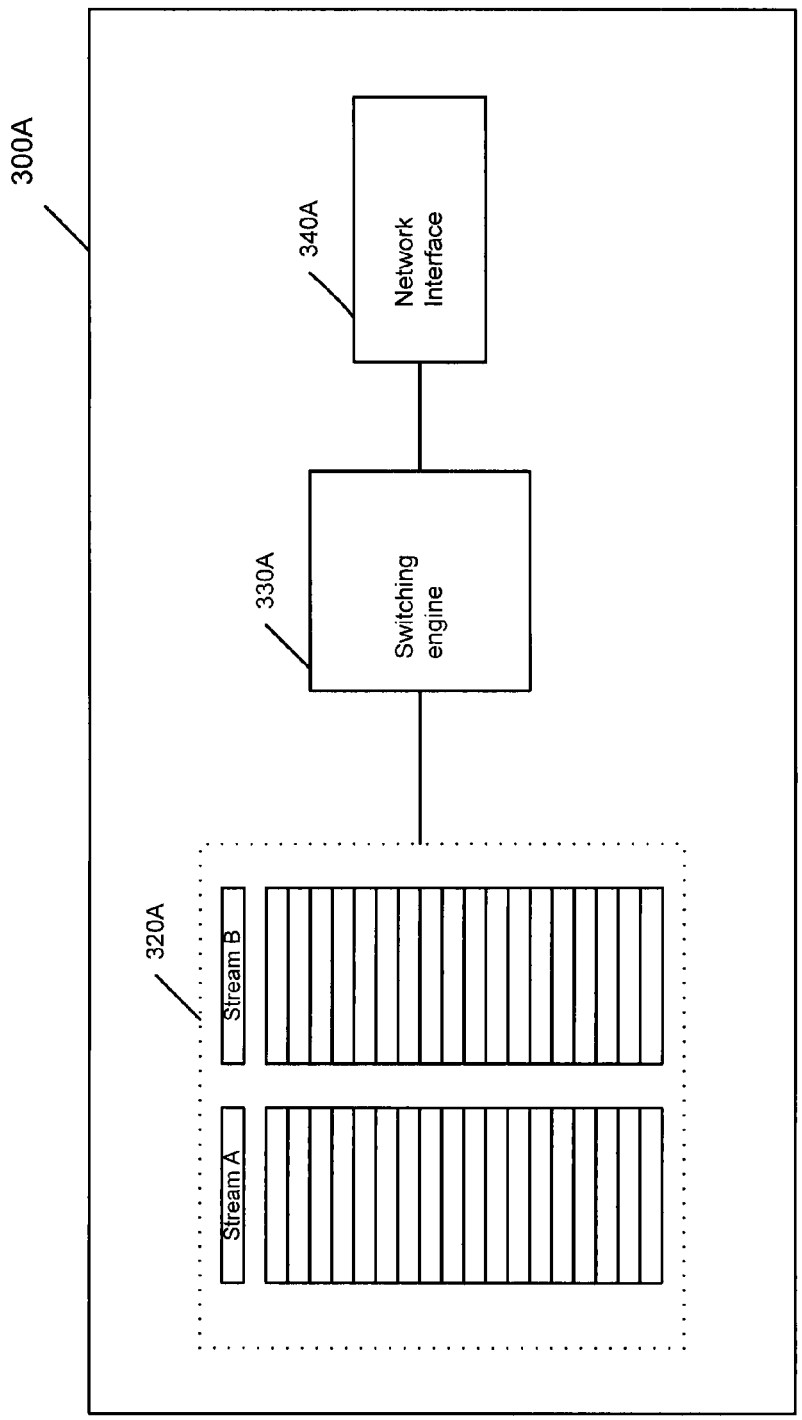
FIG. 3A is an exemplary block diagram of a duplicating switch that uses memory (e.g., RAM ("Random Access Memory")) to store a media stream for subsequent playback.

FIG. 3A provides an exemplary block diagram of a duplicating switch (e.g., duplicating switch 130 in FIG. 1) with a memory implementation. The duplicating switch 300A includes a RAM array 320A, a switching engine 330A and a network interface 340A.

The RAM array 320A may include one or more RAM memory banks structured and arranged to store one or more pieces of content. The RAM array 320A may store just a portion of the stream of data units. For example, a provider streaming out a movie may store one portion of the movie for several users to watch at one time. The RAM array 320A may store a window (e.g., a ten-minute window) of the movie that a user may use to time-shift the movie (e.g., pause, stop playing, or rewind) while staying current with the movie being broadcast.

Within the RAM array 320A, there may be location identifiers to keep track or indicate which content piece to package and/or transmit to a terminal. For example, an OSP ("Online Service Provider") may schedule a stream of data units to be transmitted to terminals at a certain time. In one example, the duplicating switch loads a portion of the stream of content pieces indicated by the location identifier to the RAM array 320A. In this example, the duplicating switch may use one or more pointers to indicate which content pieces (e.g., frames) should be transmitted to which user. In another example, an on-demand system may load a larger portion of the content pieces to memory and may use a first pointer to transmit one stream of data units and a second pointer to transmit a second stream of data units simultaneously or otherwise.

The switching engine 330A is structured and arranged to manage the content being stored in and retrieved from the RAM array 320A. Aspects of the switching engine 330A generally correspond to aspects of the switching engine 230 in FIG. 2. The switching engine 330A generally loads and retrieves content to/from the RAM array 320A. Examples of content that may be loaded and retrieved by switching engine 330A include content pieces without wrappers (e.g., OSI wrappers), such as datagrams having MPEG ("Motion Picture Experts Group") I, P, and B frames removed, video frames and differential checksum values that describe frame-to-frame changes and frames with one or more added wrappers (e.g., a layer 4 datagram). In one implementation, the switching engine 330A may implement a system of pointers designed to keep track of where in time or sequence number the terminals are with respect to the available stored content. The switching engine 330A may include a device, a program, a software controller, or another system or device in combination with the above. In another implementation, the switching engine 330A may manage overall system utilization and refuse subsequent requests for services or attempt to serve more than one terminal from one stream of data units.

The network interface 340A is designed to transmit and receive a stream of data units and generally corresponds to the first communications interface 240 and second communications interface 250 described in FIG. 2.

Figure 3B:
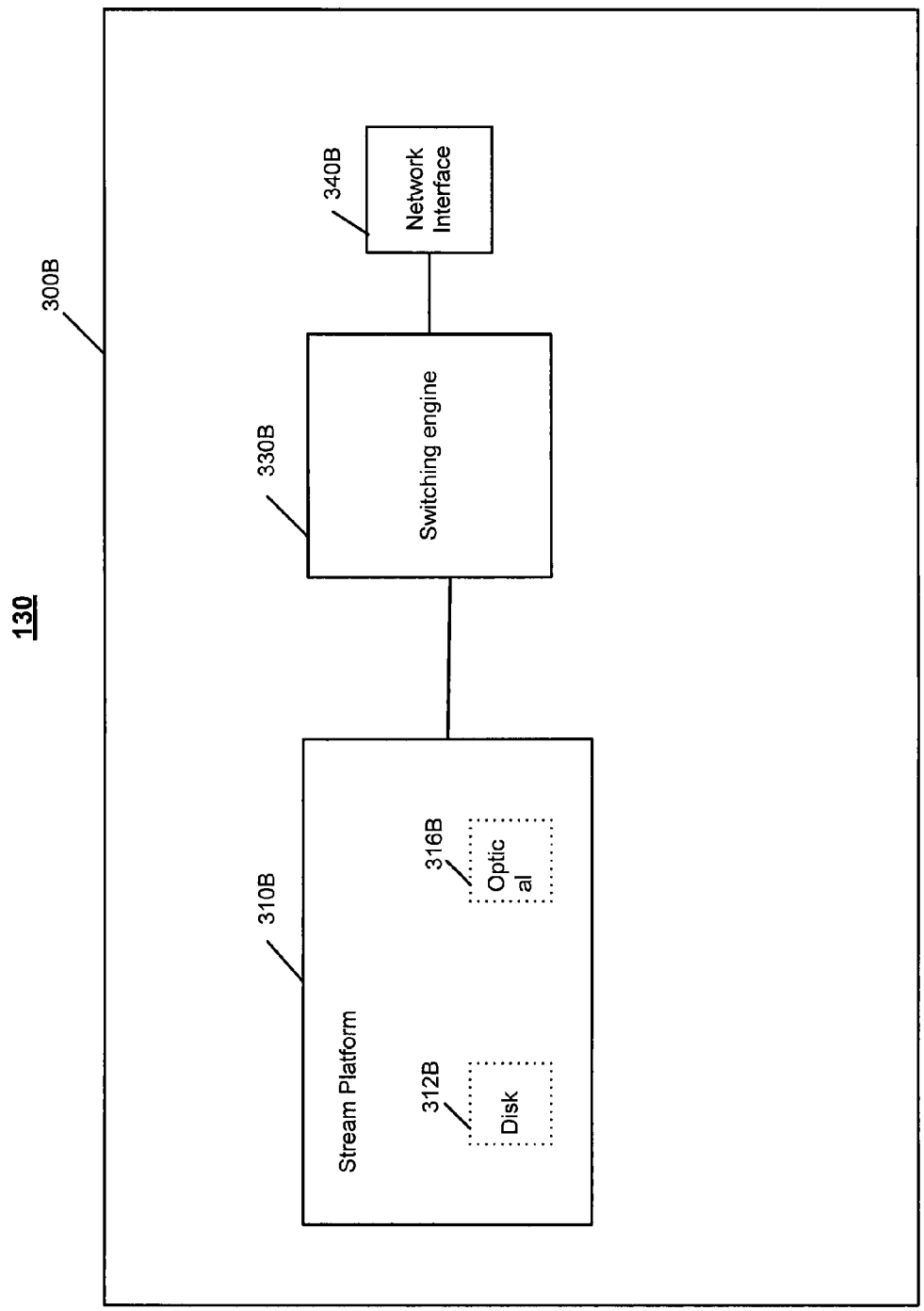
FIG. 3B is an exemplary block diagram of a duplicating switch that uses storage to store a media stream for subsequent playback.

FIG. 3B provides another exemplary block diagram of a duplicating switch 300B with a storage implementation. The duplicating switch 300B includes a stream platform 310B, a switching engine 330B, and a network interface 340B.

The stream platform 310B is structured and arranged to store content from within a stream of data units. The stream platform 310B includes a hard disk drive 312B (or a tape drive or other magnetic memory) and optical memory 316B. Generally, the stream platform 310B includes memory components with low bandwidth performance but high capacities. For example, storage may include solid-state-memory (not shown) that is slower than solid-state memory used in other applications. Typically, because of the greater storage available with less bandwidth, the stream platform 310B will store a larger portion of a stream (e.g., a movie), but will limit access to fewer simultaneous streams absent RAM or other cache interfaces.

Implementations of the storage platform 310B may include the disk storage 312B having a RAM interface to the switching engine 330B. For example, the duplicating switch may include a RAM bank and disk storage. Content pieces may be loaded to the disk storage such that the content pieces are retrieved in the order that they are transmitted. As the content pieces are being retrieved, they are loaded to the RAM bank. The higher throughput performance of the RAM banks may enable more terminals to access the same content piece. Terminals accessing the stream of data units may use a pointer to the content pieces in the RAM bank to keep track and load the data units they need in the stream of data units.

The switching engine 330B is structured and arranged to manage the content being stored and retrieved in the stream platform 310B. The switching engine 330B generally corresponds to the switching engine 330A described with respect to FIG. 3A. The network interface 340B is designed to transmit and receive a stream of data units and generally corresponds to the first communications interface 240 and second communications interface 250 described with respect to FIG. 2.

The RAM-based and storage-based systems described with respect to FIGS. 3A and 3B illustrate implementations that are designed to account for common limitations of the existing memory and storage systems (e.g., solid-state RAM offers high throughput but less storage while hard drives and optical memory offer higher storage but less throughput). However, implementations are not limited to those shown, nor are memory or storage devices necessarily subject to these constraints. For example, a disk drive may be used to implement a system managing multiple pointers and may offer higher bandwidth, while solid-state memory may offer higher density storage than the disk drive storage.

Figure 4:
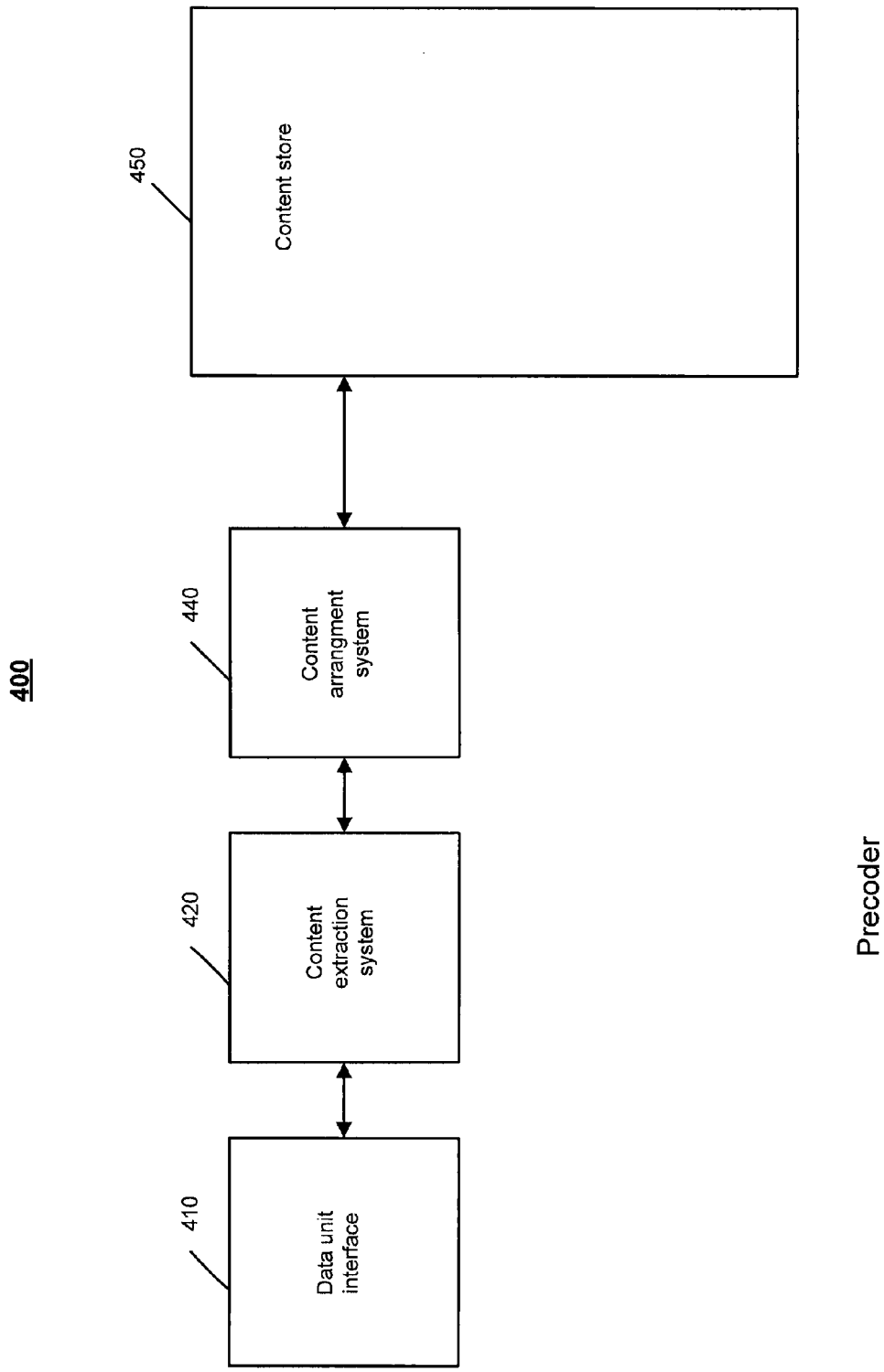
FIG. 4 is a block diagram of a precoder for use in a duplicating switch.

FIG. 4 shows an example of a duplicating switch 400 with precoder functionality. The duplicating switch 400 generally corresponds to the duplicating switch 130 of FIG. 1. The duplicating switch 400 includes a data unit interface 410, a content extraction system 420, a content arrangement system 440, and a content store 450.

The data unit interface 410 generally is structured and arranged to interface with a network to transmit and receive a data unit from the content store 440. Generally, the functionality of the data unit interface 410 corresponds to the functionality of the first communications interface 240 and the second communications interface 250 of FIG. 2. Data unit interface 410 also may be configured to segment and reassemble a data unit that has been separated during transmission, or to handle unconventional data units. For example, the data unit interface 410 may be configured to transmit/receive one or more media frames (e.g., frames formatted according to one of ETSI, DVB, ATSC, or ECCA). In one instance, if the duplicating switch 400 receives an analog signal, the data unit interface 410 may convert the signal to a recognized format that the frame or content piece may store.

The content extraction system 420 is structured and arranged to remove a data unit wrapper that is added around content for transmission. For example, the content extraction system 420 may remove one or more bits associated with OSI ("Open Systems Interconnect") information encapsulated along with the content for transmission. The content extraction system 420 also is capable of adding the wrapper when the data is retrieved from the content store 450 for subsequent transmission. For example, the content extraction system 420 may remove wrapper information when storing a stream of data units in the content store 450 and may add a different wrapper when transmitting the stream of data units from the content store 450.

The content arranger 440 is structured and arranged to direct storage and retrieval of the content information such that the content information may be retrieved in a determinate manner. For example, the content may be arranged so that the addressing information may be updated in predictable increments. In another example, the content may be arranged such that the difference between frames of content may be calculated by analyzing an associated checksum that then may be stored.

Determining where a content piece may be stored and storing the content piece may include using hard disk drive constraints to store the content piece. For example, the content store 450 (e.g., hard drive) may store the content pieces such that the same "read" or data retrieval will retrieve related content pieces that are frequently transmitted in close proximity to one another (e.g., adjacent frames in a movie or adjacent I, P, and B MPEG frames).

Determining where a content piece may be stored and storing the content piece may include using solid-state storage (e.g., various forms of RAM) to store the content piece. For example, the solid-state storage may store all or a portion of the stream in an array of RAM memory. If a portion of the RAM memory is used to store the content piece, the RAM may load a certain window of content for transmission to one or more terminals. In some implementations, the duplicating switch may store more than one instance of the stream of data units in the array of RAM.

The content store 450 is structured and arranged to store content pieces or frames. As described above with respect to the content arranger 440, the content is generally structured and arranged to be retrieved in a manner enabling transmission of related content pieces to one or more terminals. The content store 450 generally corresponds to the memory system 210 of FIG. 2, the RAM array 320A of FIG. 3A, and the storage platform 310B of FIG. 3B.

Figure 5:
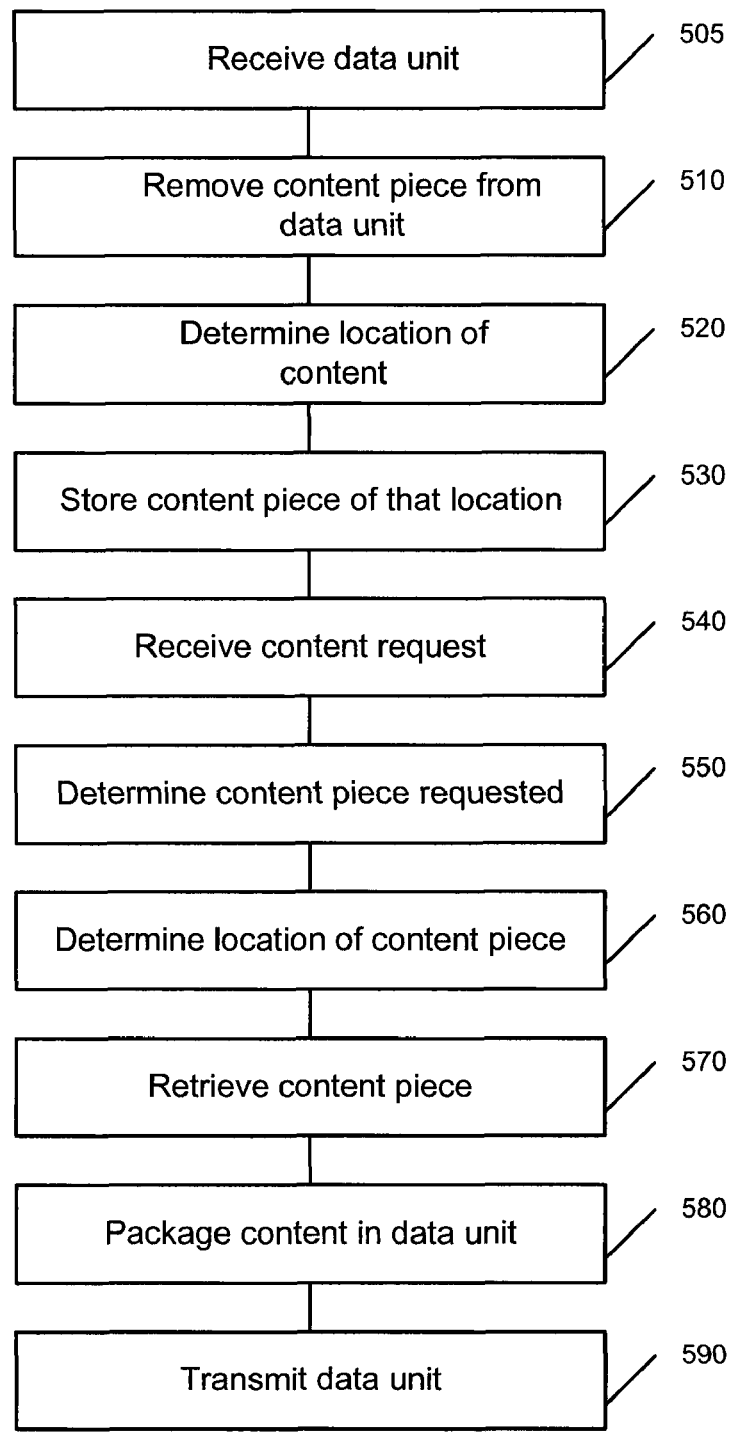
FIG. 5 is a flow chart of a procedure for processing a received data unit using a duplicating switch in a communications system, such as the communications system of FIG. 1.

FIG. 5 illustrates a procedure 500 for storing and transmitting a data unit using a duplicating switch. In general, the procedure 500 may be performed using one of the duplicating switches described with respect to FIGS. 1-4.

Initially, the duplicating switch receives a data unit (step 505) and selects the content piece from the data unit (step 510). Typically, selecting the content piece of the data unit involves identifying fields or portions of the data unit that correspond to the content, and removing some or all aspects not related to the content. For example, a duplicating switch may remove one or more layers of an OSI ("Open Systems Interconnection") header and store the remainder of the data unit as the content piece. In another example, selecting the content may include creating or modifying location identifiers to identify which portion of the data unit should be stored when the data unit is loaded to memory.

Selecting the content may include enabling one or more portions of other aspects of the data unit to be retained with the content. For example, one or more fields of the OSI header may be preserved and stored as content.

Implementations may include using a pre-coder to modify or adjust the content for storage. For example, the pre-coder may compress the content so that less bandwidth is consumed during transmission. In another example, the pre-coder may calculate a checksum or shortcut describing intra-content differences. This checksum or shortcut may be stored in place of storing some of the content pieces.

The duplicating switch determines the location in the memory system in which to store the content piece (step 520). Typically, the location for storage of the content piece is selected so that related content pieces may be retrieved in related operations. Examples of related content may include sequential frames in a video and/or content in a time slice. The duplicating switch then stores the content piece in the determined location (step 530).

At some later time, the duplicating switch receives a request for a content piece (step 540). Receiving a request for a content piece may include having a user (e.g., terminal 150 in FIG. 1) request a video stream for display on the user's home computer. Implementations also may include having other devices request the content piece. For example, a cable modem acting as a set top box may request a content piece for display to a television.

Implementations also may include having a request originate from a source other than the intended destination. For example, a cable system administrator may generate a request for the content piece on behalf of one or more subscribers.

The duplicating switch 130 determines which content piece has been requested (step 550). The requestor may designate a content piece to send. For example, a terminal may keep track of which content has been received, and may generate a request for one or more pieces of content (e.g., frame number 100 is missing). Implementations also may include having the duplicating switch track which content piece is required. For example, a duplicating switch may attempt to transmit the same content piece to several users.

The duplicating switch 130 determines where the content piece is located (step 560). To do so, the duplicating switch may use the location identifiers described with respect to FIGS. 2 and 3. Other implementations may employ a file and/or an archiving system maintained to manage access to content pieces.

The duplicating switch 130 retrieves the content piece (step 570). The duplicating switch may do so by reading a memory location specified by a location identifier. Other implementations may include retrieving multiple pieces of content information (e.g., reading a sector on a disk).

The duplicating switch 130 packages the content piece in a data unit (step 580). For example, the duplicating switch may add one or more layers of OSI information (e.g., addressing information). Implementations where one or more aspects of the data unit other than content are stored with the content piece may include modifying one or more parameters in those fields. For example, if an Internet Protocol packet is stored, the destination address may be modified to the addresses of requesting users.

Finally, the duplicating switch transmits the data unit to one or more terminals (step 590). The data unit may be transmitted in formats other than IP addressing. For example, transmitting the data unit may include transmitting an on-demand channel over a network.

Figure 6:
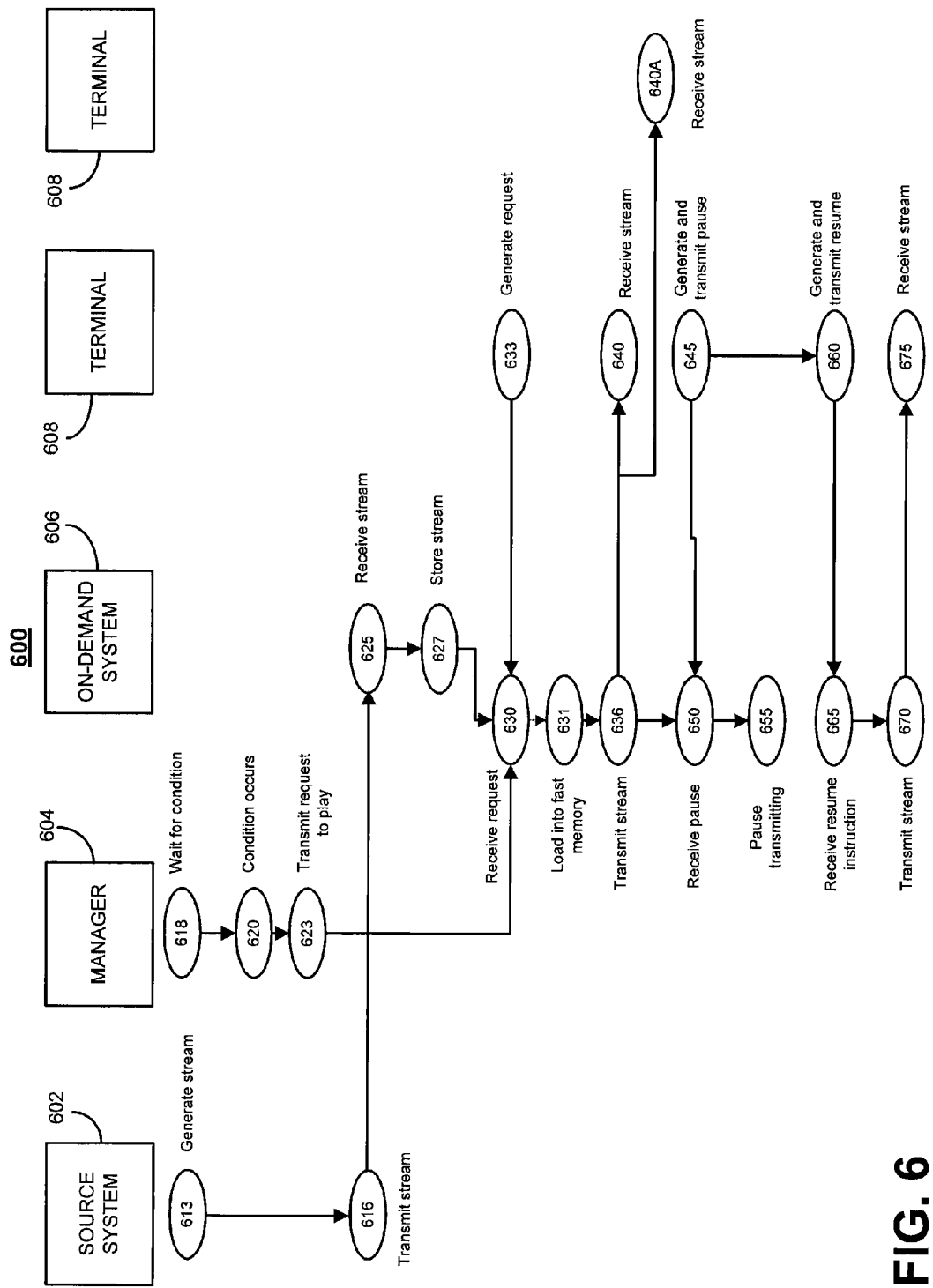
FIG. 6 is a flow chart of a procedure for providing a stream of data units in a communications system, such as the communications system of in FIG. 1.

The function of a communications system 600 will now be described with respect to FIG. 6. Communications system 600 generally includes a source system 602, a manager 604, a duplicating switch 606, and terminals 608 and 610. In general, the source system 602 corresponds to the source system 110 of FIG. 1, duplicating switch 606 corresponds to duplicating switch 130 in FIG. 1, and terminals 608 and 610 correspond to terminals 150 of FIG. 1. The manager 604 may include a cable system operator, an OSP, a content provider, or an entity capable of providing instructions or direction to the duplicating switch 606.

As shown, the source system 602 generates a stream of data units (step 613). The source system 602 transmits the stream of data units to the duplicating switch 606 (step 616).

The duplicating switch 606 receives the stream of data units (step 625). The duplicating switch 606 then stores at least the content pieces from the stream of data units (step 627).

The stream may be transmitted in a variety of ways. In some implementations, the manager 604 waits for a condition to occur (step 618). For example, the manager may be a scheduler that is programmed to direct a duplicating switch "broadcast." When the condition occurs (step 620), the manager 604 transmits a request to the duplicating switch 606 to transmit the stream of data units (step 623).

Alternatively, a terminal 608 may generate a request for a stream (step 633). For example, the terminal 608 may generate a request to view a particular video stream. The duplicating switch 606 receives the request (step 630).

In an implementation generally corresponding to the system described with respect to FIG. 3B, the duplicating switch 606 may load one or more content pieces into fast memory (e.g., RAM) (step 631). For example, the duplicating switch 606 may determine that there is inadequate bandwidth to the existing storage of the content and may load frequently-accessed content pieces to the faster memory to increase capacity.

Regardless of the mechanism used to indicate when to transmit the stream of data units to a terminal, the duplicating switch 606 may transmit the stream of data units to two or more terminals 608, 610 (step 636). In some implementations, a terminal receives a stream that has been broadcast or otherwise automatically transmitted to the stream recipient without requesting the stream of data units. In either case, terminals 608 and 610 receive the stream of data units (step 640 and 640A). Depending on the implementation, a different "stack" of content pieces may be loaded into memory to support terminal 610.

In some implementations, the terminal 608 may generate and transmit a pause message (step 645). For example, a terminal may wish to "pause" a video on-demand stream and return to the stream at a later point. When the duplicating switch 606 receives the pause message (step 650), the duplicating switch 606 pauses transmitting to the terminal 608 (step 655). The duplicating switch 606 may still transmit a stream of data units to terminal 610 (not shown). The pause message may be implemented in a variety of ways. For example, terminal 608 may keep track of which data units have been received and resume where it left off by generating and transmitting a resume message (step 660). Another example may include having the terminal 608 transmit a stop message and the duplicating switch 606 keep track of where to resume when the transmit resume message is received (step 660).

If and when the duplicating switch 606 receives the resume message (step 665), the duplicating switch 606 transmits the stream of data units 670 to the terminal (step 670). The terminal 608 then receives the stream of data units (step 675).

Figure 7A:
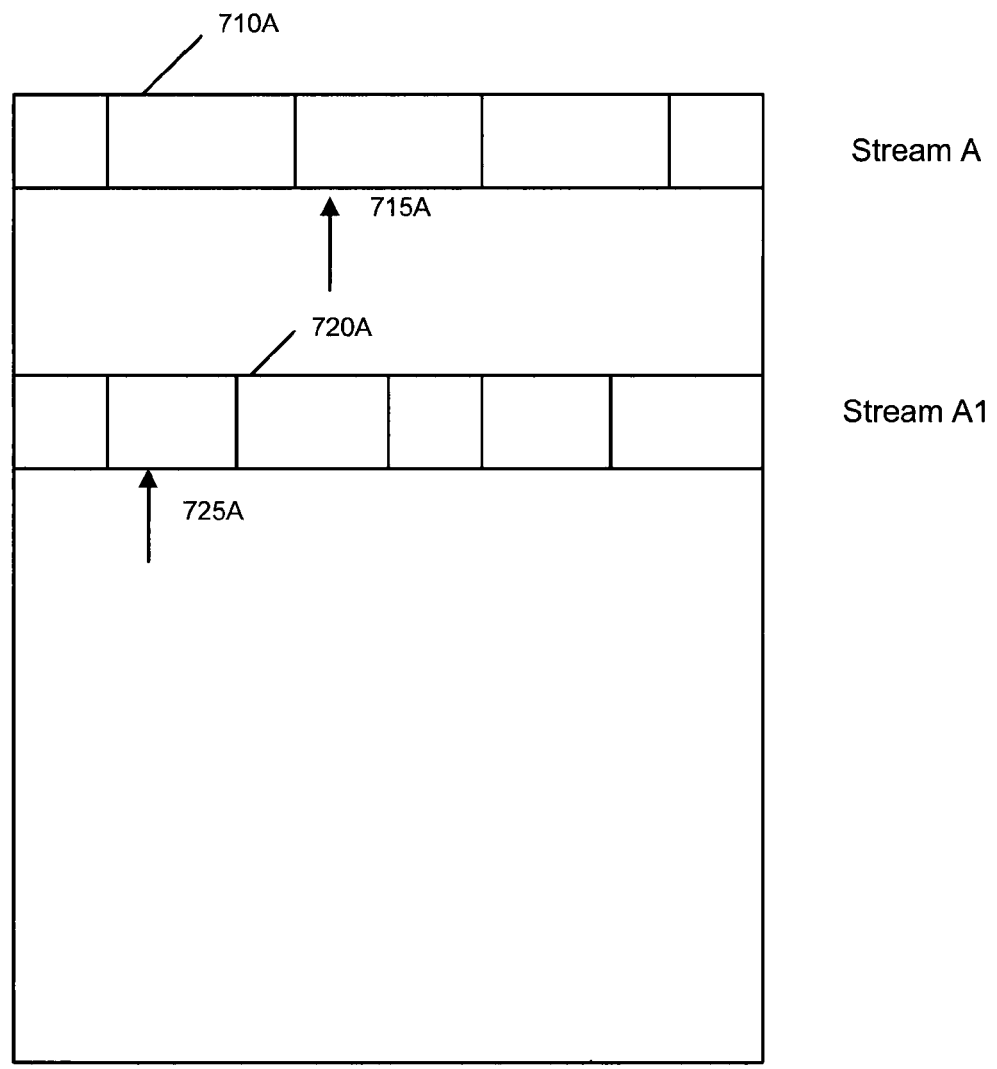
FIG. 7A illustrates a duplicating switch structured and arranged to store multiple instances of a stream of data units.

FIG. 7A depicts a duplicating switch 700A structured and arranged to store multiple instances of the stream of data units. The duplicating switch 700A transmits two streams of data units, stream A and stream $A^1$. Stream A occupies memory storage 710A in the memory bank, while stream $A^1$ occupies memory storage 720A in the memory bank. In one implementation, a first pointer 715A to the memory storage 710A indicates which content piece, relative to other content pieces, should be encapsulated as a data unit and transmitted to a terminal requesting Stream A. As mentioned previously, implementations may include storing a portion of the content pieces in the memory bank. For example, if problematic network conditions prevent a terminal from receiving some of the stream of data units, the terminal may not receive some of the content pieces and may experience gaps in receiving the stream of data units (e.g., missing time in a movie).

A second pointer 725A to the memory storage 720A indicates which portions of content pieces encapsulated in a stream of data units are being transmitted to several terminals. One or more terminals wishing to receive one or more data units in the stream of data units receive the content piece corresponding to the second pointer 725A, which is continuously advanced to the next content piece. In some implementations, the second pointer 725A may advance several content pieces and encapsulate more than one content piece in a data unit.

Figure 7B:
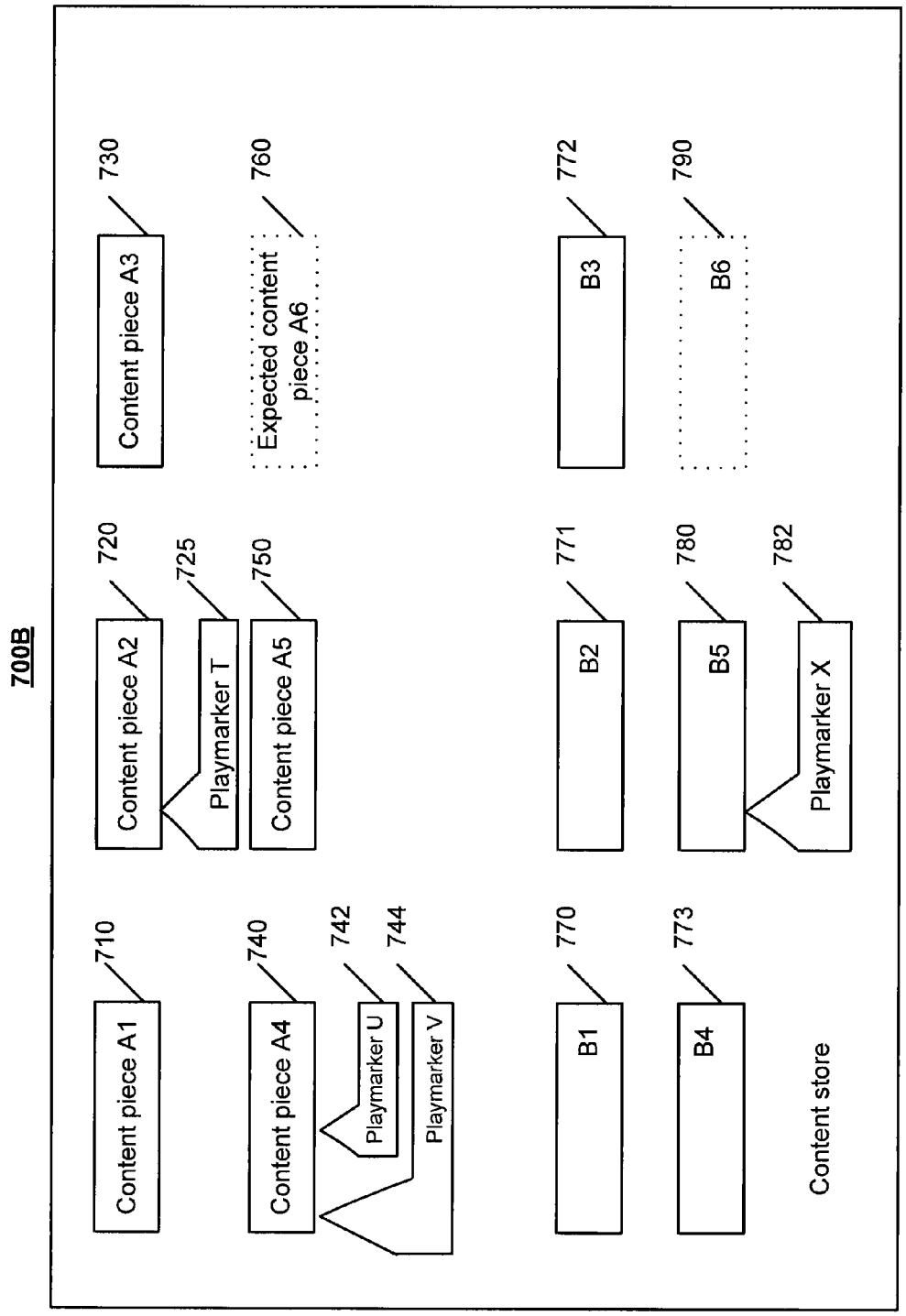
FIG. 7B illustrates a duplicating switch structured and arranged to store multiple location identifiers.

FIG. 7B depicts a duplicating switch 700B structured and arranged to store multiple location identifiers. In this example, duplicating switch 700B includes five content pieces in stream A: A1 710, A2 720, A3 730, A4 740, and A5 750. Duplicating switch 700B also includes an area of memory allocated for an expected content piece A6 760.

In one example, the duplicating switch 700B enables each of terminals T, U and V to receive its own stream of data units. Each of the terminals manages a location identifier (e.g., pointer) to direct the duplicating switch to select the appropriate content piece to be transmitted. For example, terminals T, U, and V may begin by requesting content piece A1 710 simultaneously.

After some content pieces have been transmitted, and as shown in FIG. 7B, the location identifier 725 for terminal T may be referencing content piece A2 720, while the location identifier 742 and the location identifier 744 for terminals U and V are referencing content piece A4 740 that corresponds to a different time-shift than content piece A2. This offset may have occurred because, for example, terminal T paused receipt of the stream of data units, and is now receiving content pieces that are delayed relative to those received by terminals U and V.

In another example, duplicating switch 700B includes five content pieces in stream B: B1 770, B2 771, B3 772, B4 773, and B5 780. Duplicating switch 700B also includes an area of memory allocated for an expected content piece B6 790. In one implementation, stream B may be part of the same stream of data units as stream A, but may correspond to a different portion of the stream of data units. For example, stream A may be a "video" stream 40 minutes into a video stream while stream B is five minutes into the same video stream. In another example, stream B may be identical to stream A but was added to implement better system performance. In yet another example, stream A and stream B may represent completely different video streams (e.g., two different television channels).

Figure 8:
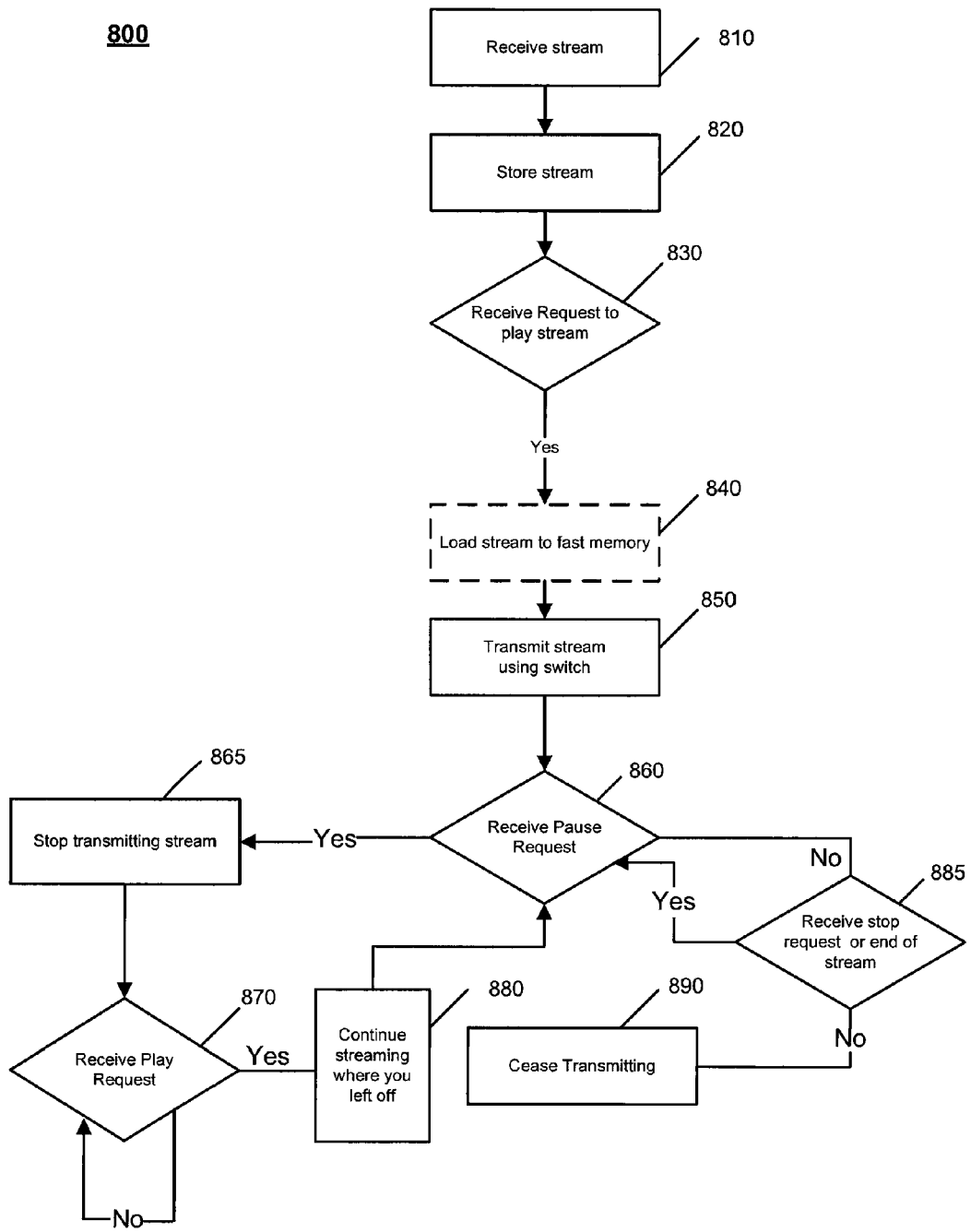
FIG. 8 is a flow chart of a procedure for time-shifting content in a communications system, such as the communications system of FIG. 1.

FIG. 8 illustrates a procedure 800 for implementing a "Pause" function on a duplicating switch, such as the duplicating switches described with respect to FIGS. 1-7. Initially, the duplicating switch receives a stream of data units (step 810) and stores content pieces from the stream of data units (step 820). With the content stored and ready for transmission, the duplicating switch waits to receive a request to play the stream of data units (step 830). Though the duplicating switch may wait for a request-to-play message, in some implementations, the duplicating switch may begin to transmit (e.g., play) upon receipt of the stream. In this configuration, the content might only be stored when a user requests pausing of the stream.

In an optional implementation, the duplicating switch may load the stream (content pieces) to fast memory (step 840). This generally corresponds to loading the stream to fast memory as described with respect to FIG. 6.

The duplicating switch transmits the stream of data units (step 850). While transmitting the stream, the duplicating switch 130 may receive a pause request (step 860). If the duplicating switch 130 receives a pause request, the duplicating switch stops transmitting the stream of data units to the terminal (step 865). With the stream of data units paused, the duplicating switch 130 may wait to receive a play request (step 870).

If the play request is received, the duplicating switch 130 continues to transmit the stream of data units where the terminal left off (step 880). If not, the duplicating switch 130 waits for the resume request. When the terminal resumes receiving the stream of data units, the duplicating switch checks for a new pause request (step 860).

If the duplicating switch 130 does not receive a pause request, the duplicating switch may receive a stop request or reach the end of the stream (step 885). If the stop request is received or the end of the stream of data units is reached, the duplicating switch ceases transmitting (step 890). If not, the duplicating switch 130 continues transmitting and returns to waiting for a pause request (step 860).

Ceasing transmitting may include automatically selecting another stream of data units to be transmitted. For example, the duplicating switch 130 may select another video to transmit when one video ends.

An "instant replay" or rewind feature may be created using a similar process, except instead of resuming transmission of a stream where the stream was produced, the stream is retransmitted time-shifted to an earlier moment in the stream (e.g., 30 seconds for a commercial, 15 seconds for a sporting event). For example, the duplicating switch may load content from memory representing the stream 30 seconds earlier, and may transmit that content beginning at the earlier location (continuing on from that point).

Other implementations are within the scope of the following claims. In particular, in some implementations, the terminal includes a set top tuner set to receive an analog signal. Also, the location identifiers described in FIG. 8 may be maintained on the client, or on a separate server or device to indicate which content piece the terminals may be receiving.

The source, network, on-demand-system, and terminal also may be distributed across different entities in the communication system, and may make use of one or more agents and/or proxies to perform certain functions.

What is claimed is:

1. A method of streaming data units to a user terminal at a duplicating switch, the method comprising:
   receiving a stream of content encoded using a first communications protocol;
   decoding the stream of content from the first communications protocol;
   using the duplicating switch to store the decoded stream of content;
   receiving a request from the user terminal for content corresponding to the stored stream, wherein the user terminal is accessible using a second communications protocol that is different from the first communications protocol; and
   in response to the received request, using the duplicating switch to duplicate the stored stream of content by:
   duplicating the stored stream of content,
   encoding the duplicated stream of content using the second communications protocol, and
   forwarding the encoded duplicated stream to the user terminal using the second communications protocol.

2. The method of claim 1 wherein using the duplicating switch to store the decoded stream of content includes storing content that is temporally related to a stream of content that is being currently duplicated.

3. The method of claim 1 wherein using the duplicating switch to store the decoded stream of content includes storing more than one instance of the same portion of content.

4. The method of claim 1 wherein using the duplicating switch to store the decoded stream of content includes storing additional instances of the stream of content as demand for the content increases.

5. The method of claim 4 further comprising using location identifiers to access content that is time-shifted as two different streams.

6. The method of claim 1 further comprising using a location identifier to indicate which portion of content is being generated into the duplicated stream of content.

7. A duplicating switch comprising:
   a first communications interface structured and arranged to receive a stream of content encoded using a first communications protocol and decode the stream of content from the first communications protocol;
   a storage processor structured and arranged to store the decoded stream of content;
   a duplicating processor structured and arranged to duplicate the stored stream of content in response to a request from a user terminal for content corresponding to the stored stream; and
   a second communications interface structured and arranged to:
   receive the request from the user terminal for content corresponding to the stored stream, wherein the user terminal is accessible using a second communications protocol that is different from the first communications protocol,
   encode the duplicated stream of content using the second communications protocol, and
   forward the encoded duplicated stream to the user terminal using the second communications protocol.

8. The duplicating switch of claim 7 wherein the storage processor is further structured and arranged to store content that is temporally related to a stream of content that is being currently duplicated.

9. The duplicating switch of claim 7 wherein the storage processor is further structured and arranged to store more than one instance of the same portion of content.

10. The duplicating switch of claim 7 wherein the storage processor is further structured and arranged to store additional instances of the stream of content as demand for the content increases.

11. The duplicating switch of claim 10 further comprising a second memory processor structured and arranged to use location identifiers to access content that is time-shifted as two different streams.

12. The duplicating switch of claim 7 further comprising a first memory processor structured and arranged to use a location identifier to indicate which portion of content is being generated into the duplicated stream.

13. A duplicating switch comprising:
   means for receiving a stream of content encoded using a first communications protocol;
   means for decoding the stream of content from the first communications protocol;
   means for using the duplicating switch to store the decoded stream of content;
   means for receiving a request from a user terminal for content corresponding to the stored stream, wherein the user terminal is accessible using a second communications protocol that is different from the first communications protocol; and
   in response to the received request, means for using the duplicating switch to duplicate the stored stream of content by:
   duplicating the stored stream of content,
   encoding the duplicated stream of content using the second communications protocol, and
   forwarding the encoded duplicated stream to the user terminal using the second communications protocol.

* * * * *